(12) United States Patent
Komatsu

(10) Patent No.: US 10,184,806 B2
(45) Date of Patent: Jan. 22, 2019

(54) ROTATION ANGLE DETECTION DEVICE

(71) Applicant: Minebea Co., Ltd., Nagano (JP)

(72) Inventor: Takahiko Komatsu, Shizuoka (JP)

(73) Assignee: MINEBEA CO., LTD., Nagano (JP)

( * ) Notice: Subject to any disclaimer, the term of this patent is extended or adjusted under 35 U.S.C. 154(b) by 1066 days.

(21) Appl. No.: 14/105,175

(22) Filed: Dec. 12, 2013

(65) Prior Publication Data

US 2014/0172359 A1 Jun. 19, 2014

(30) Foreign Application Priority Data

Dec. 13, 2012 (JP) ................................. 2012-272662

(51) Int. Cl.
 *G01D 5/20* (2006.01)
 *G01D 5/244* (2006.01)

(52) U.S. Cl.
 CPC ......... *G01D 5/204* (2013.01); *G01D 5/24461* (2013.01)

(58) Field of Classification Search
 None
 See application file for complete search history.

(56) References Cited

U.S. PATENT DOCUMENTS

| 7,076,395 B2 | 7/2006 | Ito |
| 7,146,287 B2 | 12/2006 | Kichise et al. |
| 7,157,906 B2 | 1/2007 | Miya |
| 2004/0263014 A1 | 12/2004 | Miya |
| 2005/0273295 A1 | 12/2005 | Ito |
| 2009/0179605 A1* | 7/2009 | Kanekawa ............... G01D 5/20 318/490 |
| 2012/0262158 A1* | 10/2012 | Matsuura ............ G01D 5/2046 324/207.17 |

(Continued)

FOREIGN PATENT DOCUMENTS

| JP | H03-100411 A | 4/1991 |
| JP | 2004-325386 A | 11/2004 |

(Continued)

OTHER PUBLICATIONS

Japan Patent Office, Office Action for Japanese patent application No. 2016-272662, dated Aug. 30, 2016.

(Continued)

*Primary Examiner* — An Do
*Assistant Examiner* — Renee I Wilson

(57) ABSTRACT

A rotation angle detection device includes resolvers 2a and 2b for detecting the rotation angle of a rotating body, and a signal processing circuit 10 for processing the output signals of the resolvers. The signal processing circuit 10 includes a detection signal processing section 30 for obtaining, from the output signals of the resolvers, electrical angle signals A1 and A2 corresponding to the electrical angles of the resolvers, and an abnormality detection section 50 capable of detecting an abnormality of the input signal from at least one of the resolvers. The abnormality detection section 50 performs comparison determination processing for comparing the electrical angle signal A1 and the electrical angle signal A2 obtained from the resolvers at the same time, and comparison determination processing for comparing the electrical angle signals A1 and the electrical angle signals A2 in a continuous time series at time points.

3 Claims, 5 Drawing Sheets

(56) References Cited

U.S. PATENT DOCUMENTS

2013/0013250 A1* 1/2013 Shibata .............. G01D 5/24466
702/150

FOREIGN PATENT DOCUMENTS

| JP | 2005-091204 A | 4/2005 |
|----|---------------|---------|
| JP | 2005-121626 A | 5/2005 |
| JP | 2005-147733 A | 6/2005 |
| JP | 2005-274484 A | 10/2005 |
| JP | 2005-345419 A | 12/2005 |
| JP | 2009-098028 A | 5/2009 |

OTHER PUBLICATIONS

Japan Patent Office, Office Action for Japanese patent application No. 2016-272662, dated Mar. 14, 2017.
State Intellectual Property Office of the People's Republic of China, Office Action for Chinese patent application No. 201310455952.8, dated Mar. 23, 2017.
The State Intellectual Property Office of People's Republic of China, Third Office Action for Chinese Patent Application No. 201310455952.8, dated Jul. 3, 2018. It should be noted that a machine translation is attached hereto.
Japan Patent Office, Final Office Action for Japanese Patent Application No. 2012-272662, dated Nov. 7, 2017.
State Intellectual Property Office of People's Republic of China, Second Office Action for China Patent Application No. 201310455952.8, dated Dec. 13, 2017.

* cited by examiner

ROTATION ANGLE DETECTION DEVICE

CROSS-REFERENCES TO RELATED APPLICATION

This application claims priority from Japanese Patent Application Serial No. JP2012-272662 filed Dec. 13, 2012, the contents of which are incorporated herein by reference in its entirety.

BACKGROUND OF THE INVENTION

Field of the Invention

The present invention relates to a rotation angle detection device capable of detecting an abnormality in a resolver for detecting a rotation angle.

Description of the Related Art

A rotation angle detection device is used for detecting a rotation angle of a rotor driven by a motor, torque of a torsion bar in a power steering device of an automobile, and the like. In such rotation angle detection device, for example, a plurality of resolvers are mounted on a rotor, and the rotation angle of the rotor and the driving torque of the rotor are detected from the electrical angle of the resolvers.

For example, in a power steering device of an automobile, the steering angle of the steering wheel can be known through the detection of a difference in the rotation angle between both ends of a torsion bar rotationally operated by the steering wheel. However, in the rotation angle detection device using a plurality of resolvers, when an abnormality (such as a failure of the resolver, and a disconnection or a short-circuit of a wiring between the resolver and the rotation angle detection device) occurs in one of the resolvers, the rotation angle detection cannot be normally performed. Therefore, it is necessary to perform abnormality detection for each of the resolvers.

To cope with this, when a different DC bias voltage is applied, via a pull-up resistor, and the like, to each of two-phase output lines (a sine phase component output line and a cosine phase component output line) of respective different resolvers, it is possible to detect a disconnection of one of the two-phase output lines of the same resolver, a short-circuit between the two-phase output lines of the same resolver, and a short-circuit between the output lines of different phases of the different resolvers. However, when a short-circuit occurs between the output lines of the same phase of the different resolvers (the output lines having the same DC bias voltage), the bias voltage of the output lines is not changed, and hence the short-circuit cannot be detected.

To cope with this problem, Japanese Patent Laid-Open No. 2005-147733 discloses an abnormality detection device configured such that, on the basis of the fact that, when one of the electrical angles obtained from the signals of the same phase output line of each of different resolvers is set to correspond to the same mechanical rotational position of the rotor, the combinations of the electrical angles, each corresponding to a same signal level of the same phase output line of each of the different resolvers, are known beforehand, the combinations of the electrical angles are stored in a table, and the like, such that, when the signals of the same phase output line of the different resolvers coincide with each other, it is determined whether or not the combination of the electrical angles obtained from these signals is stored, and such that, when the combination of the electrical angles is not stored, it is determined that a short-circuit is caused between the same phase output lines of the different resolvers.

However, in the abnormality detection device, it is necessary that, in order to determine an abnormality in a plurality of resolvers, a plurality of cases of disconnection and short-circuit are discriminated by DC biasing the signal lines of the resolvers, and that, in order to determine the short-circuit between the same phase output lines that cannot be discriminated on the basis of the DC bias voltage, complicated combinations of the electrical angles in the normal state are stored in a table. This results in a problem that the abnormality determination processing is complicated and requires much processing time, so as to cause a decrease in the accuracy in the stored data and the rotation angle alignment between the resolvers. Further, this results in a problem that the circuit configuration becomes complicated so as to increase the number of components, the number of assembling steps, and the like, to thereby increase the manufacturing cost.

In order to solve the above-described problems, an object of the present invention is to provide a rotation angle detection device which has a simple circuit configuration, and which can quickly and highly accurately detect an abnormality of any one of a plurality of resolvers.

SUMMARY OF THE INVENTION

In order to solve the above-described problems, a rotation angle detection device according to the present invention includes a plurality of resolvers for detecting a mechanical rotation angle (hereinafter may be expressed as "mechanical angle") of a rotating body (such as a rotor), and a signal processing circuit for processing an output signal of the plurality of resolvers. The signal processing circuit includes a detection signal processing section for obtaining, from each of the output signals of the plurality of resolvers, an electrical angle signal corresponding to an electrical angle of each of the resolvers, and an abnormality detection section capable of detecting an abnormality of the input signal from at least one of the plurality of resolvers.

A correlation exists between the electrical angle signals respectively corresponding to the electrical angles of the plurality of resolvers rotationally driven according to the rotation of the rotating body. Therefore, by comparing the electrical angle signals at substantially the same time, the abnormality detection section can determine whether or not the output signal from at least one of the plurality of resolvers is abnormal.

Note that "substantially the same time" (which may be expressed as "the same time" in the present specification) means to include a temporal error that is allowed within a range in which a significant error in the detection of the mechanical angle and the electrical angle is not caused when the temporal change of the mechanical angle (angular velocity of the mechanical angle) of the resolver is taken into account.

Further, the angle of the mechanical rotation is always continuously changed, and hence the existence of an abnormality can be determined for each of the resolvers in such a manner that the electrical angle signals in a continuous time series (at a plurality of time points) are compared with each other for each of the resolvers, so as to detect a change in the electrical angle signals in the time series. That is, when an irregular change is detected in the electrical angle signals, it is determined that an abnormality is caused in at least one of the resolvers.

In this way, the abnormality detection section can detect an abnormality of the input signal from at least one of the plurality of resolvers by performing comparison determination processing in which the electrical angle signals obtained from each of the resolvers at the same time are compared with each other. Also, the abnormality detection section can detect even an abnormality of the input signal from any one of the plurality of resolvers by performing comparison determination processing in which time-series changes of the electrical angle signals obtained from each of the resolvers are compared with each other.

Further, the abnormality detection section may be provided with an electrical angle signal conversion section and a signal comparison determination section. In the electrical angle signal conversion section, each of electrical angle signals of a plurality of resolvers, each having a different axial double angle, is converted into a converted electrical angle signal which is a common multiple or a common measure of the electrical angle signals. When the electrical angles of the converted electrical angle signals respectively obtained from the plurality of resolvers are made coincident with each other in this way, the converted electrical angle signals from the plurality of resolvers also substantially coincide with each other as long as the output signals from the resolvers are normal. Therefore, by performing comparison determination processing for determining whether or not the converted electrical angle signals from the plurality of resolvers are substantially coincide with each other, the signal comparison determination section can determine whether or not the output signal from at least one of the resolvers is abnormal. Note that the substantial coincidence between the converted electrical angle signals means a coincidence within an allowable error range of the converted electrical angle signal, in which a variation, and the like, allowed for the components of the rotation angle detection device is taken into account.

It may also be configured such that a first resolver whose axial double angle is a first integer (nX), and a second resolver whose axial double angle is a second integer (mX) are used, and such that the electrical angle signal conversion section respectively converts the electrical angle signals of the first resolver and the second resolver into a converted electrical angle signal corresponding to a common multiple (typically a least common multiple) of the first integer and the second integer. For example, in the case where the axial double angle of the first resolver is 2, and where the axial double angle of the second resolver is 3, when the electrical angle of the first resolver is converted into an electrical angle three times the electrical angle of the first resolver, and when the electrical angle of the second resolver is converted into an electrical angle twice the electrical angle of the second resolver, it is possible to obtain a converted electrical angle signal equal to the least common multiple of both the electrical angle signals of the first and second resolvers.

Further, the abnormality detection section may be provided with a time-series angle comparison determination section. The time-series angle comparison determination section compares, with each other, a plurality of electrical angle signals of each of the resolvers at a plurality of time points in a continuous time series, and determines whether or not the electrical angle signal of each of the resolvers changes regularly with the lapse of time.

The electrical angle always continuously changes in the same manner as the mechanical angle. Therefore, when an irregular change (a change without continuity) is detected in the above-described determination, it can be determined that the output signal from the resolver generating the electrical angle signal is abnormal. Of course, the time-series angle comparison determination section substantially simultaneously performs (for example, by time sharing) the comparison determination processing of the electrical angle signals of the plurality of resolvers provided in the rotation angle detection device.

The time points adjacent to each other in the time series need only to be arranged at sufficiently short time intervals in consideration of the angular velocity of the mechanical angle of the resolver. The time points may be arranged at equal time intervals, or the next time point may be set to a time point in the time series when the rotation angle detection device detects a temporal change in the mechanical angle.

In the rotation angle detection device provided with a plurality of resolvers, according to present invention, an abnormality of each of the resolvers can be detected quickly and highly accurately by simple abnormality determination processing and hence by means of a simple circuit configuration without much time being taken for the abnormality determination processing. In this case, complicated combinations of electrical angles in the normal state need not be stored in a table, and also the problem does not occur, which causes a decrease in accuracy in the stored data and the rotation angle alignment between the resolvers. Further, with the present invention, since the circuit configuration is simple, it is possible to reduce the number of components, the number of assembling steps, and the manufacturing cost of the rotation angle detection device.

DETAILED DESCRIPTION OF THE PREFERRED EMBODIMENTS

In the following, a rotation angle detection device according to the present invention will be described with reference to the accompanying drawings.

Embodiment 1

Figure 1:
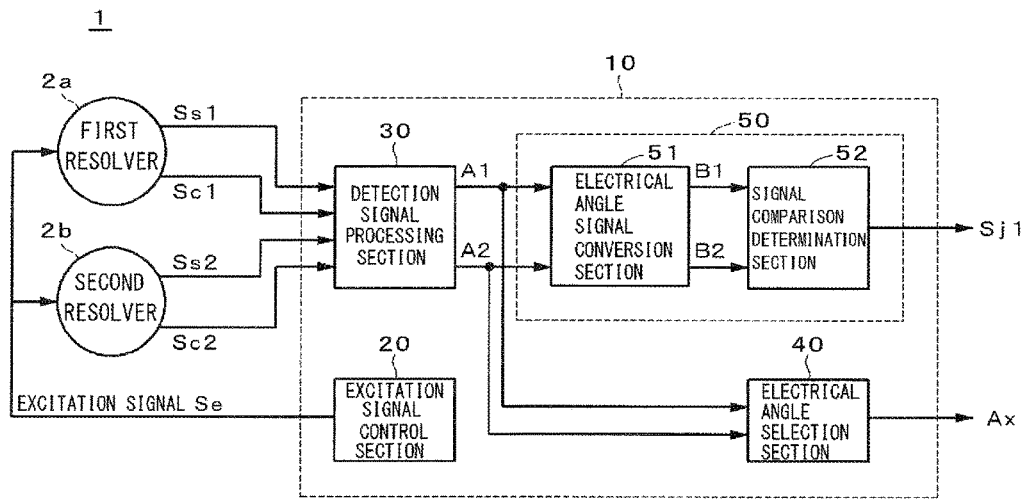
FIG. 1 is a view for explaining a schematic configuration in an embodiment (embodiment 1) of a rotation angle detection device according to the present invention.

FIG. 1 is a view for explaining a schematic configuration of an embodiment (embodiment 1) of a rotation angle detection device according to the present invention.

<Schematic Configuration of Rotation Angle Detection Device>

A rotation angle detection device 1 includes a first resolver 2a having an axial double angle (nX) of 2, a second resolver 2b having an axial double angle (mX) of 3, and a signal processing circuit 10. For example, the first resolver 2a is attached to the one end side of a rotating body (not shown), while the second resolver 2b is attached to the other end side of the rotating body. Both the resolvers are attached to the rotating body so that the zero degree of the mechanical angle of the resolvers corresponds to the zero degree of the rotation angle of the rotating body.

Therefore, when the rotating body is rotated without being twisted, the mechanical angle of the first resolver 2a coincides with the mechanical angle of the second resolver 2b. That is, no phase difference is caused between the mechanical angles of both the resolvers. On the other hand, when the rotating body is twisted at the time of rotation thereof, the mechanical angles of both the resolvers are different from each other in correspondence with the amount of twist. That is, a phase difference is caused between the mechanical angles of both the resolvers.

The signal processing circuit 10 includes an excitation signal control section 20, a detection signal processing section 30, an electrical angle selection section 40, and an abnormality detection section 50. When an output signal from at least one of the first resolver 2a and the second resolver 2b is abnormal, the signal processing circuit 10 detects the abnormality.

The excitation signal control section 20 outputs an excitation signal Se (for example, a sine wave signal) to the first resolver 2a and the second resolver 2b. The first resolver 2a excited by the excitation signal Se outputs a sine wave signal Ss1 and a cosine wave signal Sc1 (these signals may be hereinafter expressed as "output signals of the first resolver 2a"), each of which has an amplitude corresponding to the mechanical angle of the first resolver 2a. Similarly, the second resolver 2b excited by the excitation signal Se outputs a sine wave signal Ss2 and a cosine wave signal Sc2 (these signals may be hereinafter expressed as "output signals of the second resolver 2b"), each of which has an amplitude corresponding to the mechanical angle of the second resolver 2b.

The detection signal processing section 30 analog-to-digital converts the output signals of both the resolvers, and outputs the converted signals as an electrical angle signal A1 of the first resolver 2a, and an electrical angle signal A2 of the second resolver 2b. The electrical angle signal A1 of the first resolver 2a is a signal corresponding to an electrical angle obtained from the amplitudes of the sine wave signal Ss1 and the cosine wave signal Sc1 which are outputted from the first resolver 2a. Similarly, the electrical angle signal A2 of the second resolver 2b is a signal corresponding to an electrical angle obtained from the amplitudes of the sine wave signal Ss2 and the amplitudes of the cosine wave signal Sc2 which are outputted from the second resolver 2b. The electrical angle selection section 40 selects at least one of the electrical angle signals A1 and A2 and outputs the selected signal as electrical angle signal information Ax.

<Abnormality Detection of Output Signal from Resolver>

The signal processing circuit 10 detects an abnormality of the output signals from the first resolver 2a and the second resolver 2b by using the abnormality detection section 50 which includes an electrical angle signal conversion section 51 and a signal comparison determination section 52.

Figure 2:
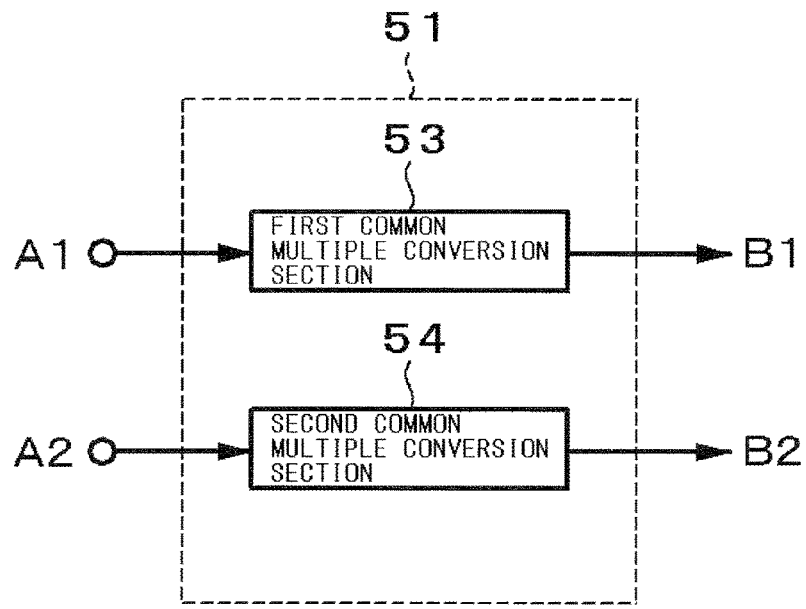
FIG. 2 is a view showing a schematic configuration of an electrical angle signal conversion section of an abnormality detection section provided in the rotation angle detection device shown in FIG. 1.

As shown in FIG. 2, the electrical angle signal A1 of the first resolver 2a, which is outputted by the detection signal processing section 30, is inputted into a first common multiple conversion section 53 provided in the electrical angle signal conversion section 51. Similarly, the electrical angle signal A2 of the second resolver 2b is inputted into a second common multiple conversion section 54. The first common multiple conversion section 53 converts the electrical angle of the electrical angle signal A1 of the first resolver 2a into an electrical angle three times the electrical angle of the electrical angle signal A1, and sets the converted signal as a converted electrical angle signal B1. The second common multiple conversion section 54 converts the electrical angle of the electrical angle signal A2 of the second resolver 2b into an electrical angle twice the electrical angle of the electrical angle signal A2, and sets the converted signal as a converted electrical angle signal B2. In each of the converted electrical angle signals B1 and B2, the electrical angle of 2160 degrees corresponds to the mechanical angle of 360 degrees.

When the electrical angles of the converted electrical angle signals B1 and B2 are made to coincide with each other, the converted electrical angles of the converted electrical angle signals B1 and B2 coincide with each other as long as the output signals from the first resolver 2a and the second resolver 2b are normal.

Thereby, the following determination processing is performed. First, the signal comparison determination section 52 compares the converted electrical angle signals B1 and B2 obtained at the same time with each other, so as to determine whether or not converted electrical angle signals B1 and B2 coincide with each other. When the converted electrical angle signals B1 and B2 coincide with each other, the signal comparison determination section 52 can determine that the output signals from the first resolver 2a and the second resolver 2b are normal. In other words, the signal comparison determination section 52 can determine that each of the resolvers, the wirings between each of the resolvers and the signal processing circuit 10, electrical connection components, such as connectors, and the like, are normal. Then, when the signal comparison determination section 52 determines that the resolvers, the wirings, the electrical connection components, and the like, are normal, the signal comparison determination section 52 does not output a determination signal Sj1. In this case, the signal comparison determination section 52 sets the output level thereof to a low level.

On the other hand, when the converted electrical angle signals B1 and B2 do not coincide with each other in the above-described determination, the signal comparison determination section 52 can determine that the output signal from at least one of the first resolver 2a and the second resolver 2b is abnormal. In other words, the signal comparison determination section 52 can determine that an abnormality occurs in any of at least one of the resolvers, one of the wirings between the resolver and the signal processing circuit 10, and the electrical connection components, such as the connectors, and the like. In this case, the signal comparison determination section 52 outputs the determination signal Sj1 (High level).

Note that a certain range of error is allowed in the determination performed by the rotation angle detection device 1, and hence, for the determination, it is only necessary that the converted electrical angle signals of both the resolvers coincide with each other within the allowable error range. Further, when the rotating body is twisted, a difference between the mechanical angles of both the resolvers is caused, but, for the purpose of control (for example, control of a steering apparatus of an automobile, and the like), the difference is not determined as abnormal as long as the difference is within an expected range.

<Abnormality Detection Procedure>

Figure 3:
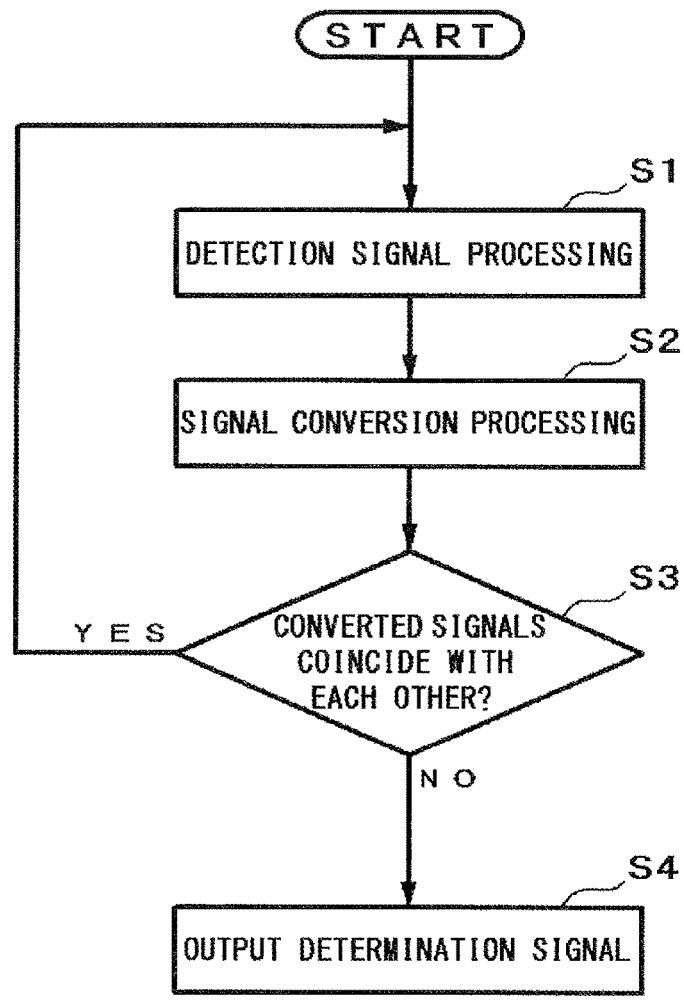
FIG. 3 is a flow chart showing an abnormality detection procedure in the rotation angle detection device shown in FIG. 1.

FIG. 3 is a flow chart showing an abnormality detection procedure in the rotation angle detection device 1.

First, the rotation angle detection device 1 performs detection signal processing (step S1). In step S1, the detection signal processing section 30 of the signal processing circuit 10 generates the electrical angle signal A1 and the electrical angle signal A2 on the basis of the output signals (the sine wave signal Ss1 and the cosine wave signal Sc1) from the first resolver 2a, and on the basis of the output signals (the sine wave signal Ss2 and the cosine wave signal Sc2) from the second resolver 2b.

Next, the rotation angle detection device 1 performs the signal conversion processing (step S2). In step S2, the electrical angle signal conversion section 51 of the abnormality detection section 50 respectively converts the electrical angle signal A1 and the electrical angle signal A2 into the converted electrical angle signals B1 and B2, each of which has an electrical angle that corresponds to a common multiple of the electrical angles of the electrical angle signal A1 and the electrical angle signal A2.

Next, by using the signal comparison determination section 52, the rotation angle detection device 1 determines whether the converted electrical angle signals (converted signals) B1 and B2 are coincident with each other (YES) or not (NO) (step S3). When the converted signals are coincident with each other, the rotation angle detection device 1 determines that the output signal from the first resolver 2a, and the output signal from the second resolver 2b are normal, and then returns to the processing of step S1.

When the converted signals are not coincident with each other (NO), the rotation angle detection device 1 outputs the determination signal Sj1 from the signal comparison determination section 52 (step S4).

Embodiment 2

Next, another embodiment (embodiment 2) of the rotation angle detection device according to the present invention will be described with reference to FIG. 4 and FIG. 5.

<Schematic Configuration of Rotation Angle Detection Device>

Figure 4:
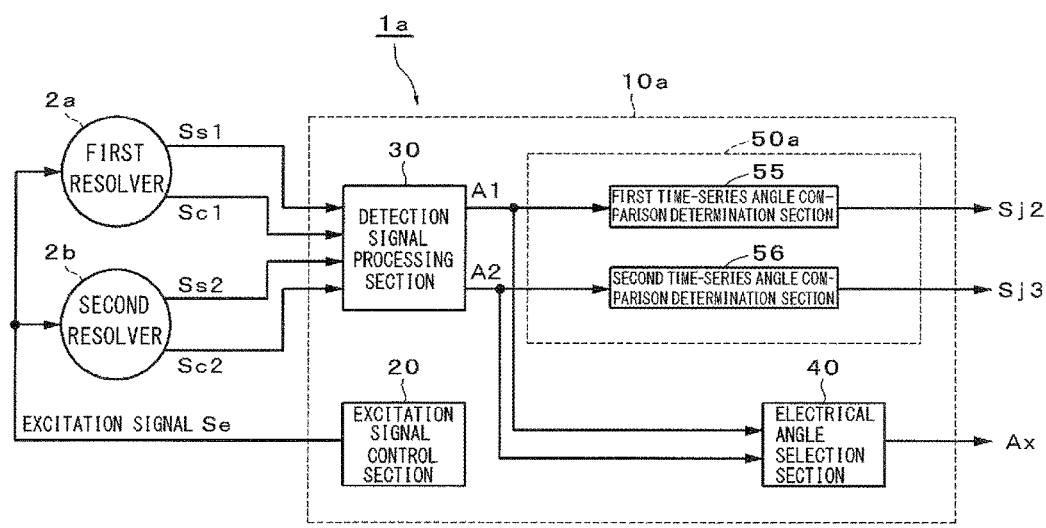
FIG. 4 is a view showing a schematic configuration of another embodiment (embodiment 2) of the rotation angle detection device according to the present invention.

In a rotation angle detection device 1a shown in FIG. 4, components having the same functions as those of the rotation angle detection device 1 are denoted by the same reference numerals and characters as those of the rotation angle detection device 1, and the description thereof is omitted.

The rotation angle detection device 1a is different from the rotation angle detection device 1 in that, instead of the abnormality detection section 50 including the electrical angle signal conversion section 51 and the signal comparison determination section 52, the rotation angle detection device 1a is provided with an abnormality detection section 50a including a first time-series angle comparison determination section 55 and a second time-series angle comparison determination section 56. In the rotation angle detection device 1a, the electrical angle signal A1 of the first resolver 2a outputted from the detection signal processing section 30 of a signal processing circuit 10a is inputted into the first time-series angle comparison determination section 55. Similarly, the electrical angle signal A2 of the second resolver 2b is inputted into the second time-series angle comparison determination section 56.

<Detection of Abnormality of Output Signal from Resolver>

The first time-series angle comparison determination section 55 determines whether or not the electrical angle signal A1 changes regularly with the lapse of time. Specifically, the first time-series angle comparison determination section 55 checks the values of the electrical angle signals A1 inputted continuously in a time series, and thereby determines whether or not the electrical angle signal A1 is abnormal in continuity. When determining that the electrical angle signal A1 is abnormal in continuity, the first time-series angle comparison determination section 55 outputs a determination signal Sj2 to the outside.

For example, the first time-series angle comparison determination section 55 sets, as the center of the time series, the time when the electrical angle signal corresponding to the n-th electrical angle (for example, 20 degrees) is obtained in the time series, and then compares, with each other, three electrical angle signals consisting of the electrical angle signal corresponding to the n-th electrical angle, the electrical angle signal corresponding to the (n−1)-th electrical angle (for example, 15 degrees) corresponding to the time previous to the center time, and the electrical angle signal corresponding to the (n+1)-th electrical angle (for example, 25 degrees) corresponding to the time subsequent to the center time. Thereby, the first time-series angle comparison determination section 55 determines whether or not the electrical angle signals respectively corresponding to the (n−1)-th, n-th and (n+1)-th electrical angles change regularly with the lapse of time, that is, the electrical angle signals change successively at the respective electrical angles of 15 degrees, 20 degrees and 25 degrees.

The electrical angle always continuously changes in the same manner as the mechanical angle. Therefore, in the above-described determination, when an irregular change (non-continuous change) is caused in the electrical angle signal A1, it is possible to determine that the electrical angle signal A1 obtained from the first resolver 2a is abnormal. That is, it is possible to determine that an abnormality is caused in any one of the first resolver 2a, a wiring between the first resolver 2a and the signal processing circuit 10a, and an electrical connection component such as the connectors, and the like. Similarly, it is possible to determine the abnormality of the electrical angle signal A2 obtained from the second resolver 2b.

<Abnormality Detection Procedure>

Figure 5:
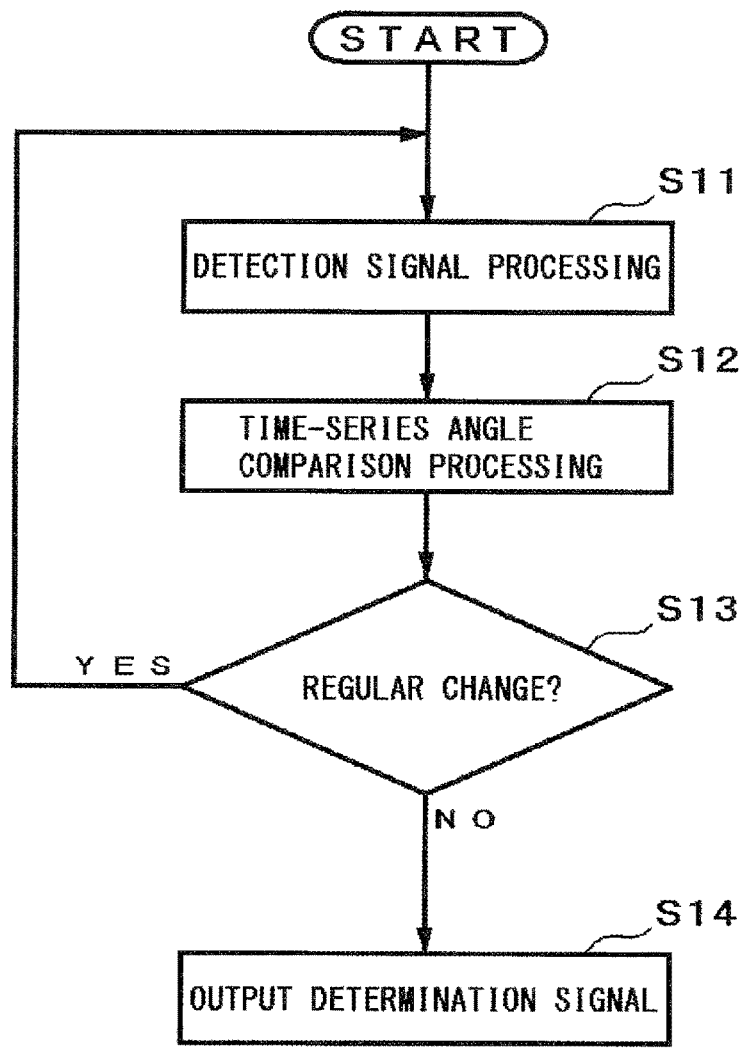
FIG. 5 is a flow chart showing an abnormality detection procedure in the rotation angle detection device shown in FIG. 4.

FIG. 5 is a flow chart showing an abnormality detection procedure in the rotation angle detection device 1a.

First, the rotation angle detection device 1a performs detection signal processing (step S11). In step S11, the detection signal processing section 30 of the signal processing circuit 10a generates the electrical angle signal A1 and the electrical angle signal A2 on the basis of the output signal from the first resolver 2a, and the output signal from the second resolver 2b.

Next, the rotation angle detection device 1a performs time-series angle comparison processing (step S12). In step S12, the first time-series angle comparison determination section 55 provided in the abnormality detection section 50a compares, with each other, a plurality of the electrical angle signals A1 corresponding to a plurality of electrical angles. Similarly, the second time-series angle comparison determination section 56 compares a plurality of the electrical angle signals A2 with each other.

Next, on the basis of the result of the comparison in step 12, the rotation angle detection device 1a determines whether or not the electrical angle signals A1 and A2 change regularly (change continuously) (step S13). When the electrical angle signals A1 and A2 change regularly, that is, at the time of YES, the rotation angle detection device 1a determines that the output signal from the first resolver 2a and the output signal from the second resolver 2b are normal, and the process returns to the processing in step S11.

As a result of the comparison in step S13, when it is determined that the electrical angle signal A1 does not change regularly, that is, at the time of NO, the first time-series angle comparison determination section 55 outputs the determination signal Sj2 to the outside. Further, when it is determined that the electrical angle signal A2 does not change regularly, that is, at the time of NO, the second time-series angle comparison determination section 56 outputs a determination signal Sj3 to the outside (step S14). Of course, when it is determined that both the electrical angle signals A1 and A2 do not change regularly, both the determination signals Sj2 and Sj3 are outputted.

Embodiment 3

Next, another embodiment (embodiment 3) of the rotation angle detection device according to the present invention will be described with reference to FIG. 6.

Figure 6:
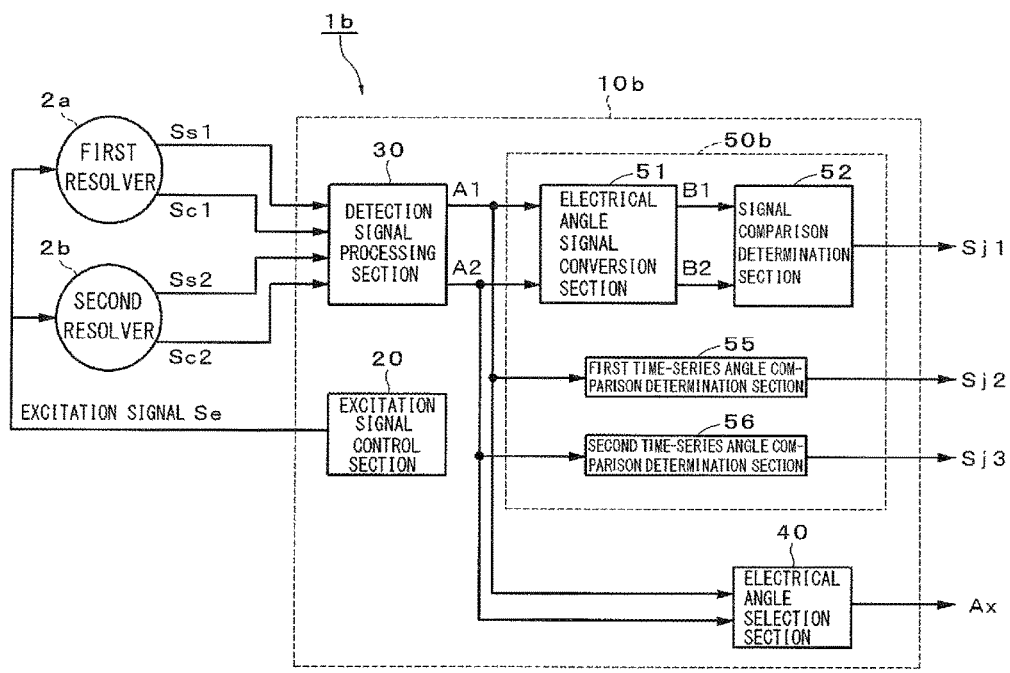
FIG. 6 is a view showing a schematic configuration of another embodiment (embodiment 3) of the rotation angle detection device according to the present invention.

In a rotation angle detection device 1b shown in FIG. 6, the configuration of a signal processing circuit 10b is different from the configuration of the signal processing circuit 10 of the rotation angle detection device 1, and from the configuration of the signal processing circuit 10a of the rotation angle detection device 1a. Specifically, the rotation angle detection device 1b is different from the rotation angle detection device 1 and the rotation angle detection device 1a in that an abnormality detection section 50b of the signal processing circuit 10b is provided with the resolver electrical angle signal conversion section 51 and the signal comparison determination section 52 which detect an abnormality by conversion of electrical angle signals from the respective resolvers, and is provided with the first time-series angle comparison determination section 55 and the second time-series angle comparison determination section 56 which determine whether or not the electrical angle signals from the respective resolvers change regularly.

Therefore, the rotation angle detection device 1b can determine, similarly to the rotation angle detection device 1, whether or not the output signal from at least one of the first resolver 2a and the second resolver 2b is abnormal, and can determine, similarly to the rotation angle detection device 1a, whether or not the electrical angle signal A1 obtained from the first resolver 2a, and the electrical angle signal A2 obtained from the second resolver 2b are abnormal.

Note that the rotation angle detection device according to the present invention and the abnormality detection processing procedure of the rotation angle detection device are not limited to the above-described embodiments, and can be suitably modified within the scope and spirit of the present invention.

For example, the number of the resolvers is not limited to two, and the resolver is not limited to the two-phase output type.

In the rotation angle detection device (embodiment 1) having the electrical angle signal conversion section, the axial double angle of the resolver is not limited to those of the embodiment, and both the resolvers may have the same axial double angle. In this case, the electrical angles of the respective resolvers are equally multiplied (are typically multiplied by 1). Further, the electrical angle signal conversion section may be provided with a common measure conversion section instead of the common multiple conversion section. It is only necessary that each of the electrical angles of each of a plurality of resolvers is converted into the same electrical angle by the electrical angle signal conversion section. The conversion of the electrical angle signal can be performed by multiplication processing, and the like, but may be performed on the basis of a conversion table prepared beforehand.

In the rotation angle detection device (embodiment 2) having the time-series angle comparison determination section, the number of the electrical angle signals compared with each other is not limited to three of the (n−1)-th, n-th, and (n+1)-th signals, and at least the two (n−1)-th and n-th signals need only be used. That is, also, the two n-th and (n+1)-th signals need only be used. When the two electrical angle signals are used, it is possible to determine the presence or absence of an abnormality in the change of the electrical angle signal and to determine the increase or decrease direction of the mechanical angle. The amount of change of the electrical angle signal in determining whether or not the electrical angle signal changes regularly can be obtained by performing multiplication processing, and the like, each time the determination is performed, but the amount of change of the electrical angle signal in the determination may be obtained by using a conversion table prepared beforehand.

A part of or all of the signal processing device may be configured as an integrated circuit, and the detection signal processing section may be a general R/D (resolver digital conversion) LSI. Each of the components of the rotation angle detection device may be configured by hardware, or may be configured by software processing.

The rotation angle detection device according to the present invention can be subjected to industrial production, use, and the like, and can be handled as a subject of commercial transactions. Therefore, the present invention is an industrially applicable invention having an economic value.

DESCRIPTION OF SYMBOLS 1a, 1b, 1c Rotation angle detection device
2a, 2b Resolver
10, 10a, 10b Signal processing circuit
20 Excitation signal control section
30 Detection signal processing section
40 Electrical angle selection section
50, 50a, 50b Abnormality detection section
51 Electrical angle signal conversion section
52 Signal comparison determination section
53, 54 Common multiple conversion section
55, 56 Time-series angle comparison determination section
A1, A2 Electrical angle signal
Ax Electrical angle signal information
B1, B2 Converted electrical angle signal
Sc1, Sc2 Cosine wave signal of resolver
Ss1, Ss2 Sine wave signal of resolver
Sj1, Sj2, Sj3 Determination signal

What is claimed is:
1. A rotation angle detection device, comprising:
a plurality of resolvers for detecting a mechanical rotation angle of a rotating body;

a signal processing circuit for processing an output signal of at least one of the plurality of resolvers;

a detection signal processing section for obtaining, from the output signal of each of the plurality of resolvers, an electrical angle signal corresponding to the electrical angle of each of the resolvers; and an abnormality detection section capable of detecting an abnormality of an input signal from at least one of the plurality of resolvers, and configured to perform one or both of first comparison determination processing for comparing, with each other, electrical angle signals respectively obtained from the plurality of resolvers at substantially the same time, and second comparison determination processing for comparing, with each other, regular changes of the electrical angle signals obtained from each of the resolvers in a time series, wherein the abnormality detection section includes a time-series angle comparison determination section, and wherein the time-series angle comparison determination section performs comparison determination processing by comparing, with each other, the electrical angle signals of each of the resolvers at a plurality of time points in continuous time series, and determines a non-continuous change in the electric angle signal from at least one of the plurality of resolvers, and thereby detects an abnormality for the input signal from the at least one of the plurality of resolvers.

2. The rotation angle detection device as set forth in claim 1, wherein the abnormality detection section includes an electrical angle signal conversion section for converting the electrical angle signal of each of the plurality of resolvers into a converted electrical angle signal corresponding to a common multiple or a common measure of the electrical angle signal, and a signal comparison determination section for comparing, with each other, the respective converted electrical angle signals outputted from the electrical angle signal conversion section, and thereby performs comparison determination processing at substantially the same time.

3. The rotation angle detection device as set forth in claim 2, wherein the plurality of resolvers include a first resolver having an axial double angle of a first integer, and a second resolver having an axial double angle of a second integer, and wherein the electrical angle signal conversion section converts the electrical angle signal of the first resolver and the electrical angle signal of the second resolver into a converted electrical angle signal corresponding to a common multiple of the first integer and the second integer.

\* \* \* \* \*